(12) United States Patent
Tan (10) Patent No.: US 8,665,706 B2
(45) Date of Patent: Mar. 4, 2014

(54) REDUNDANCY IN POINT-TO-MULTIPOINT (PMP) BACKHAUL NETWORKS

(75) Inventor: Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 136 days.

(21) Appl. No.: 13/246,307

(22) Filed: Sep. 27, 2011

(65) Prior Publication Data

US 2013/0077472 A1    Mar. 28, 2013

(51) Int. Cl.
*G06F 11/00* (2006.01)
(52) U.S. Cl.
USPC .......................................................... 370/221
(58) Field of Classification Search
USPC ......... 370/215, 216, 218, 219, 220, 223, 355, 370/358, 395.52
See application file for complete search history.

(56) References Cited

U.S. PATENT DOCUMENTS

2006/0002370 A1*  1/2006  Rabie et al. .................... 370/351
2012/0147737 A1*  6/2012  Taylor et al. ................... 370/219

* cited by examiner

*Primary Examiner* — Mark Rinehart
*Assistant Examiner* — Ellen A Kirillova

(57) ABSTRACT

A device establishes a failover virtual local area network (VLAN) with a first concentration node, a first Ethernet backhaul router, and an access node of a first Ethernet backhaul coverage area. The device also receives, via the first Ethernet backhaul router, an indication of a failure of a second concentration node of a second Ethernet backhaul coverage area intersecting with the first Ethernet backhaul coverage area. The device further enables, based on the failure indication, a switchover of traffic, associated with the second concentration node, to the device and via the failover VLAN.

23 Claims, 11 Drawing Sheets

REDUNDANCY IN POINT-TO-MULTIPOINT (PMP) BACKHAUL NETWORKS

BACKGROUND

Telecommunication providers spend an inordinate amount of time and money for installation of wired or fiber-based backhaul networks. Backhaul networks provide an intermediate link between a core or backbone network and small edge sub-networks. Point-to-multipoint (PMP) wireless networks are being used today to provide backhaul transport for macro, micro, and pico cellular development in locations where wired backhaul networks are not feasible. A PMP wireless network may include a single concentration (or aggregation) node providing coverage to multiple access (or edge) nodes. The multiple access nodes may provide voice and/or data service for multiple user equipment (UEs). PMP wireless networks are based on time-division multiplexing (TDM) or Ethernet.

In PMP wireless Ethernet backhaul (WEB) networks, throughput capacities or bandwidth used may range from ten (10) mega bits per second (Mbps) per access node to one-hundred Mbps per access node, and a number of access nodes may range from four (4) to twelve (12). Coverage between two concentration nodes, of a PMP WEB network, may include overlapping boundaries that provide mutual coverage for common access nodes in between the two concentration nodes. PMP WEB networks are wideband networks in terms of throughput (e.g., 1 to 2 giga bits per second (Gbps)) at the concentration node, and are broadband to wideband networks in terms of throughput (e.g., 10 to 100 Mbps) for each access node. PMP WEB networks may include an option for point-to-point (PTP) communications between access nodes, and may enable adaptive modulation from four (4) quadrature amplitude modulation (QAM) to 1024 QAM.

However, a failure of a single concentration node in a PMP WEB network can spell disaster for access nodes, and associated UEs, within the failed concentration node coverage area. This is because the backhaul for such access nodes and associated UEs is unavailable and traffic cannot flow upstream and downstream to and from the access nodes and the associated UEs.

DETAILED DESCRIPTION OF PREFERRED EMBODIMENTS

The following detailed description refers to the accompanying drawings. The same reference numbers in different drawings may identify the same or similar elements.

Systems and/or methods described herein may provide backhaul redundancy and diversity between and among two or more concentration nodes of a PMP wireless backhaul network. In a mutually covered intersection between areas covered by two concentration nodes, traffic from an access node may be actively provided to and from both concentration nodes. If one concentration node fails, traffic may still flow actively to the other concentration node which may minimize the impact of a total failure among access nodes served by the failed concentration node. The use of active-active or active-standby virtual local area networks (VLANs) may contribute to traffic flow redundancy and diversity of transport to and from a core network.

In one example implementation, a network device associated with a first Ethernet backhaul (EBH) coverage area may establish a failover VLAN with a first concentration node, a first EBH router, and an access node of the first EBH coverage area. The network device may receive, via the first EBH router, an indication of failure of a second concentration node of a second EBH coverage area, and may enable a switchover of traffic provided to/from the second EBH coverage area. The network device may receive traffic from the second concentration node via the access node, and may provide the traffic to a core network via the failover VLAN. The network device may receive traffic from the core network, destined for the second concentration node, via the failover VLAN, and may provide the traffic to the access node.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
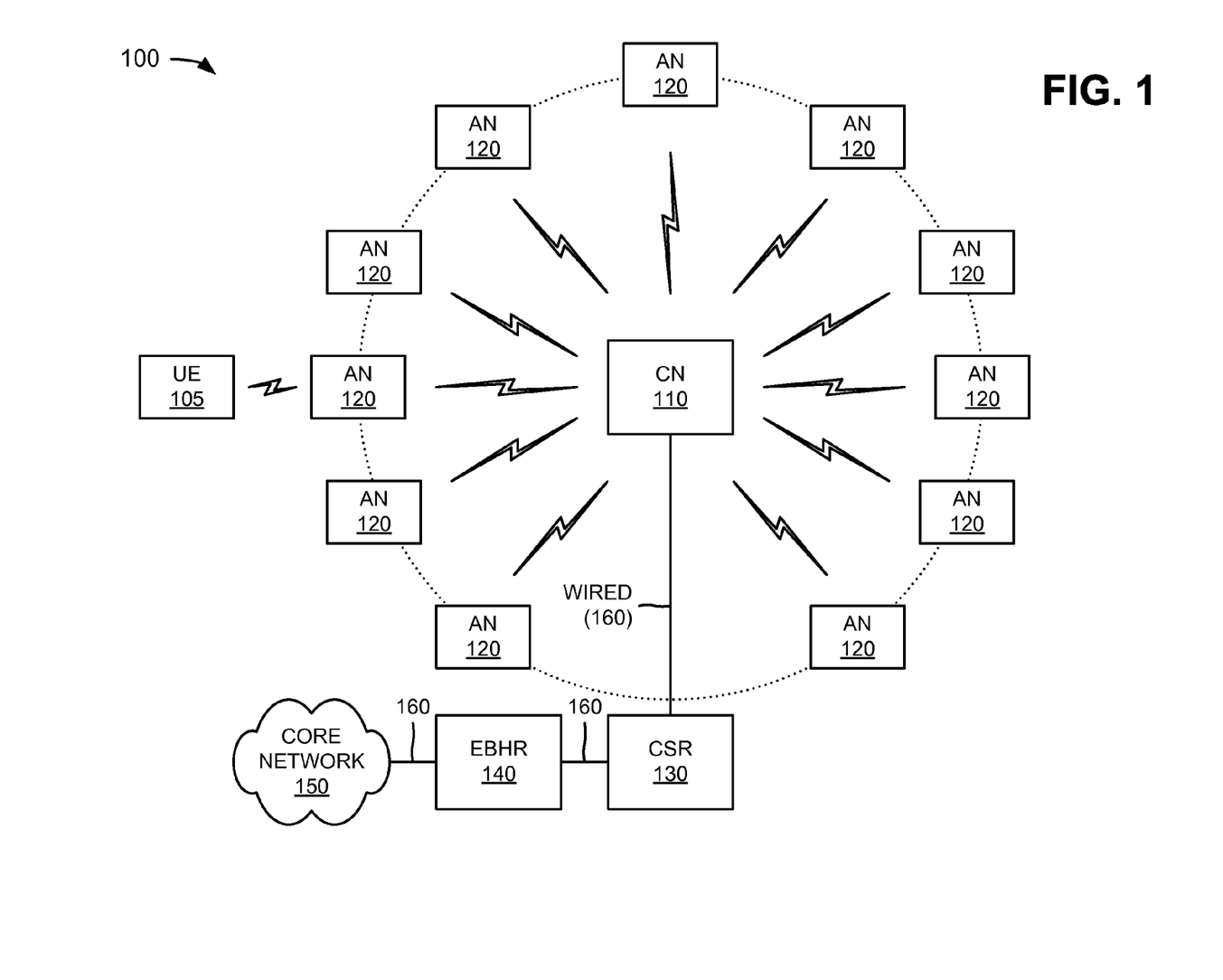
FIG. 1 is a diagram of an example network in which systems and/or methods described herein may be implemented.

FIG. 1 is a diagram of an example network 100 in which systems and/or methods described herein may be implemented. As illustrated, network 100 may include a UE 105, a concentration node (CN) 110, multiple access nodes (ANs) 120, a cell site router (CSR) 130, an Ethernet backhaul aggregation router (EBHR) 140, and a core network 150. Devices and/or networks of network 100 may interconnect via wired and/or wireless connections. For example, UE 105 may wirelessly interconnect with ANs 120, and ANs 120 may wirelessly interconnect with CN 110. CN 110, CSR 130, EBHR 140, and core network 150 may interconnect via one or more wired connections 160. One UE 105, one CN 110, eleven ANs 120, one CSR 130, one EBHR 140, and one core network 150 have been illustrated in FIG. 1 for simplicity. In practice, there may be more UEs 105, CNs 110, ANs 120, CSRs 130, EBHRs 140, and/or core networks 150, or less ANs 120 than depicted in FIG. 1.

UE 105 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a personal computer; or other types of computation or communication devices. In one example, UE 105 may include a device that is capable of communicating with core network 150 via CN 110, ANs 120, CSR 130, and EBHR 140.

CN 110 may include one or more computation or communication devices, that gather, process, and/or provide information in a manner described herein. For example, CN 110 may include a server device, a workstation computer, a network device, etc. In an example implementation, CN 110 may include one or more computation and/or communication devices that receive traffic (e.g., voice and/or data) from core network 150, via CSR 130 and EBHR 140, and wirelessly transmit that traffic to one or more ANs 120. CN 110 may also include one or more devices that wirelessly receive traffic from one or more ANs 120 and transmit that traffic to core network 150, via CSR 130 and EBHR 140, or to other ANs 120.

AN 120 may include a network device, such as a gateway, a router, a switch, a firewall, a network interface card (NIC), a hub, a bridge, a proxy server, a multiplexer, a base station, or some other type of device that processes and/or transfers traffic. In an example implementation, AN 120 may include one or more computation and/or communication devices that wirelessly receive traffic (e.g., voice and/or data) from CN 110 and wirelessly transmit that traffic to UE 105. AN 120 may also include one or more devices that wirelessly receive traffic from UE 105, and wirelessly transmit that traffic to CN 110 or to other UEs 105. In one example, AN 120 may support one or more of the following: fault management; class of service prioritization; VLAN encapsulation; Ethernet framing; VLAN tagging; a link aggregation control protocol; Ethernet in a first mile; frame expansion; etc.

CSR 130 may include a network device, such as a gateway, a router, a switch, a firewall, a NIC, a hub, a bridge, a proxy server, a multiplexer, or some other type of device that processes and/or transfers traffic. In an example implementation, CSR 130 may include one or more computation and/or communication devices that receive traffic (e.g., voice and/or data) from core network 150, via EBHR 140, and transmit that traffic to CN 110. CSR 130 may also include one or more devices that receive traffic from CN 110, and transmit that traffic to core network 150, via EBHR 140.

EBHR 140 may include a network device, such as a gateway, a router, a switch, a firewall, a NIC, a hub, a bridge, a proxy server, a multiplexer, or some other type of device that processes and/or transfers traffic. In an example implementation, EBHR 140 may be an aggregation point for multiple CSRs 130. EBHR 140 may include one or more computation and/or communication devices that receive traffic (e.g., voice and/or data) from core network 150, and transmit that traffic to CN 110, via CSR 130. EBHR 140 may also include one or more devices that receive traffic from CN 110, via CSR 130, and transmit that traffic to core network 150.

Core network 150 may include one or more devices that transfer/receive traffic to/from a circuit-switched and/or packet-switched network. In one implementation, core network 150 may include a core network architecture of the Third Generation Partnership Project (3GPP) long term evolution (LTE) wireless communication standard. For example, core network 150 may include an all-Internet protocol (IP) packet-switched core network that supports high-speed wireless and wireline broadband access technologies. Alternatively, or additionally, core network 150 may provide packet-switched services, which are traditionally circuit-switched.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
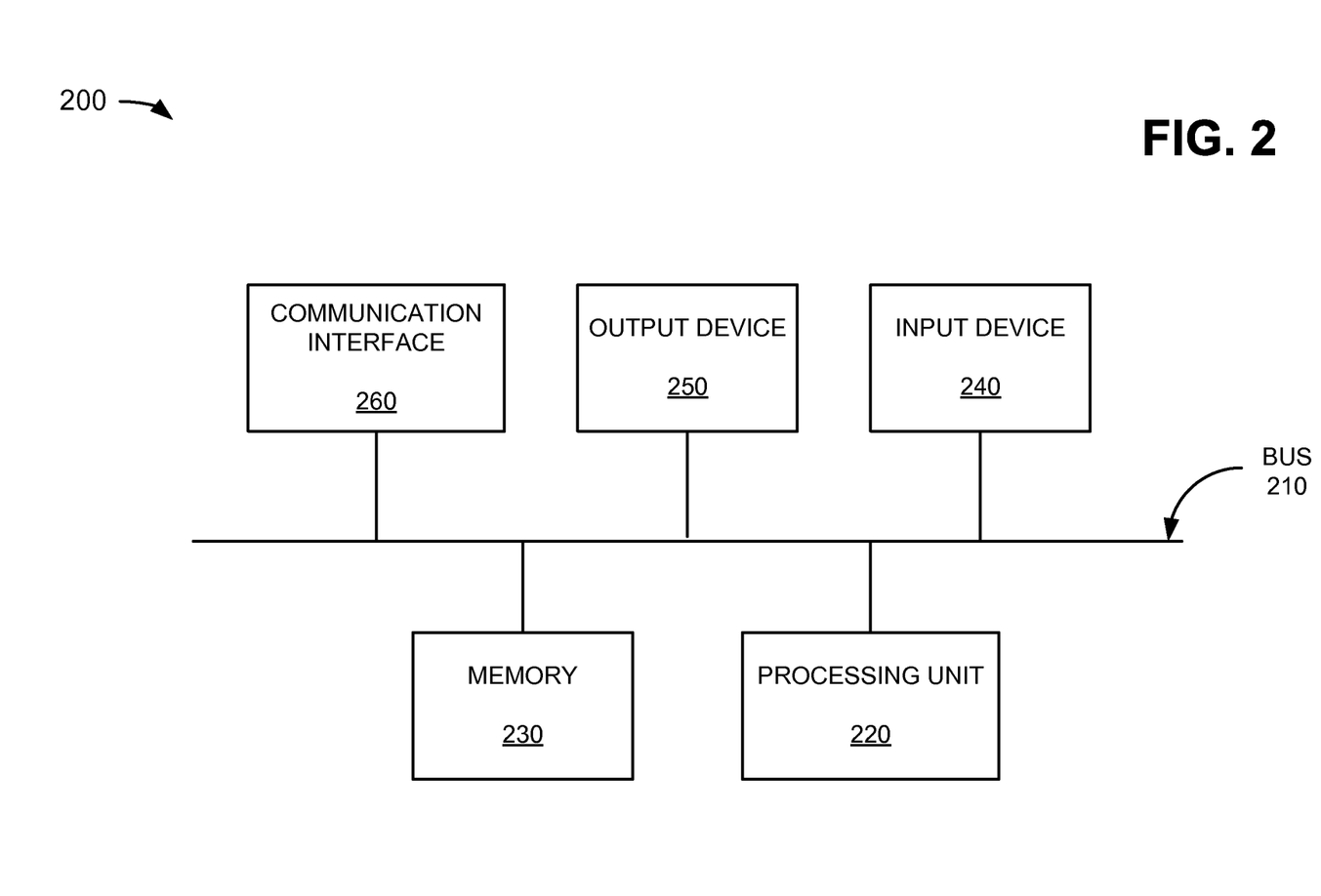
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3A:
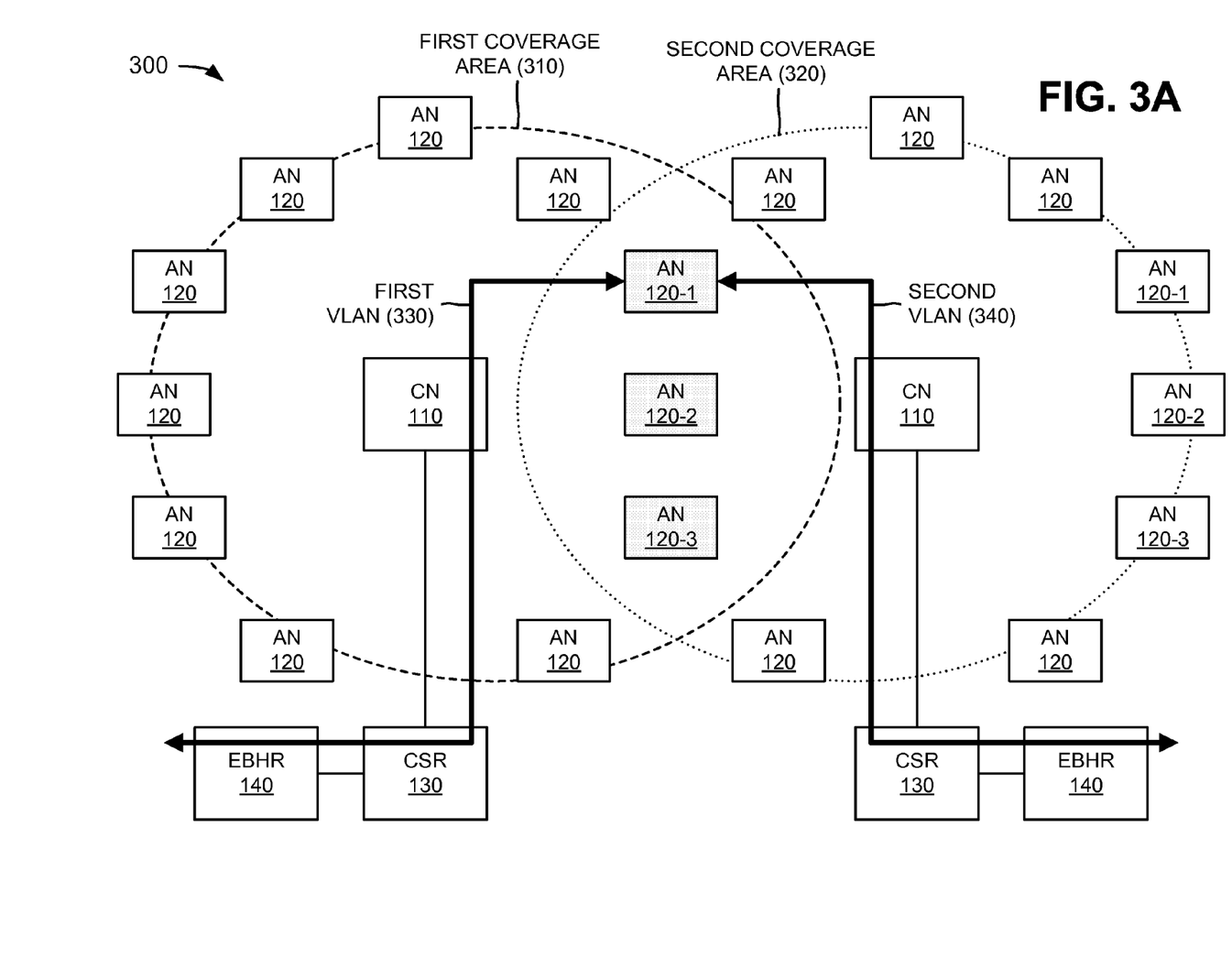
FIGS. 3A and 3B are diagrams of example operations capable of being performed by another example network in which systems and/or methods described herein may be implemented.
Figure 3B:
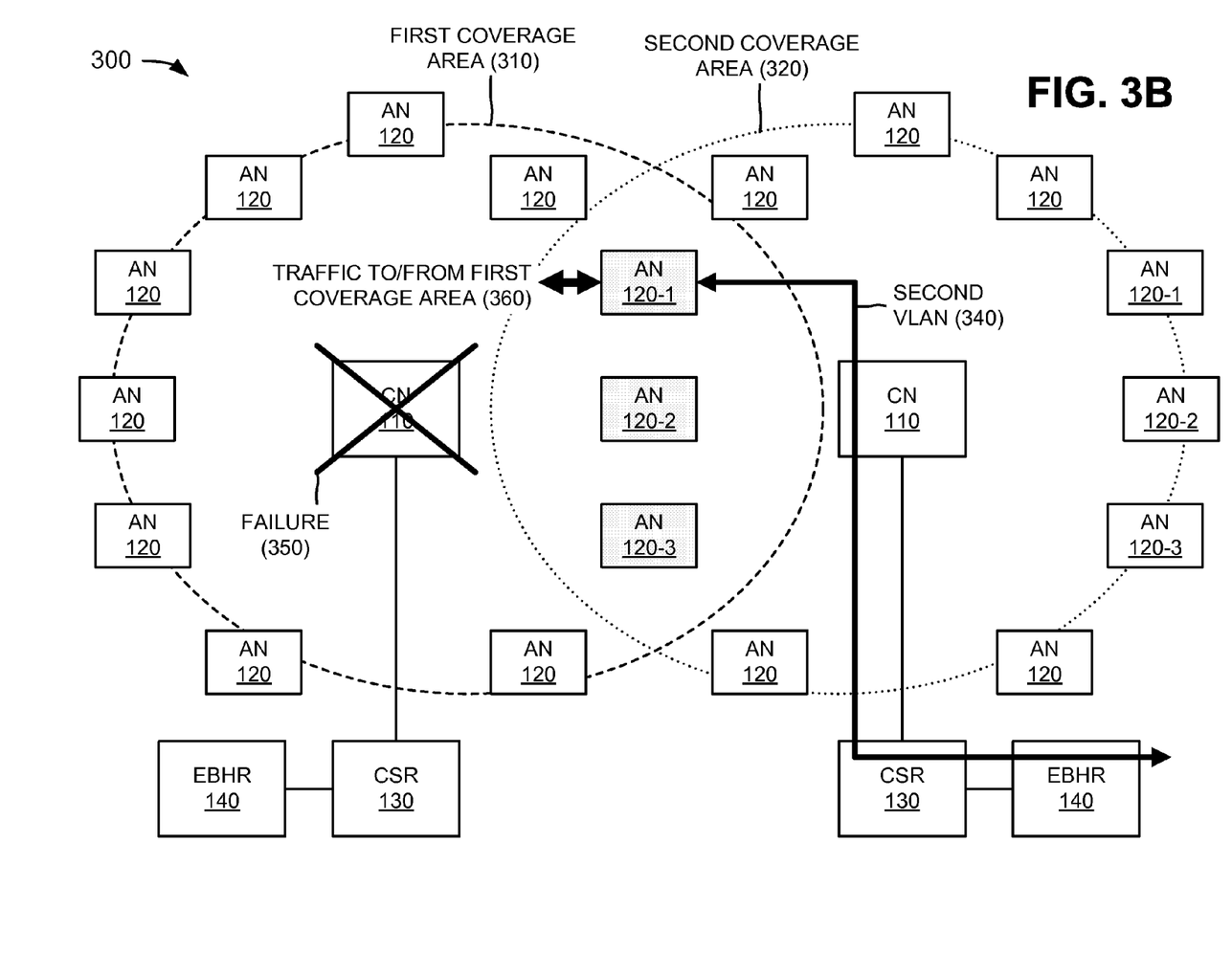

FIGS. 3A and 3B are diagrams of example operations capable of being performed by another example network 300 in which systems and/or methods described herein may be implemented. As shown, network 300 may include a first coverage area 310 that includes a first CN 110, a first group of ANs 120, a first CSR 130, and a first EBHR 140. Network 300 may also include a second coverage area 320 that overlaps with first coverage area 310 and includes a second CN 110, a second group of ANs 120, a second CSR 130, and a second EBHR 140. CNs 110, ANs 120, CSRs 130, and EBHRs 140 may include the features described above in connection with, for example, one or more of FIGS. 1 and 2. Devices of network 300 may interconnect via wired and/or wireless connections.

First coverage area 310 may represent an area that is provided wireless coverage via the first CN 110. Second coverage area 320 may represent an area that is provided wireless coverage via the second CN 110. As further shown in FIG. 3A, one or more ANs 120 may be provided at an intersection of first coverage area 310 and second coverage area 320, and thus may transmit traffic to or receive traffic from either or both of CNs 110. For example, ANs 120-1, 120-2, and 120-3 may be provided at the intersection of first coverage area 310 and second coverage area 320, and thus may transmit traffic to or receive traffic from either or both of CNs 110.

A first VLAN 330 may be established between one of ANs 120 (e.g., AN 120-1) provided at the intersection of first coverage area 310 and second coverage area 320, the first CN 110, the first CSR 130, and the first EBHR 140. First VLAN 330 may include a group of devices (e.g., AN 120-1, the first CN 110, the first CSR 130, and the first EBHR 140) with a common set of requirements that communicate as if the devices were attached to the same broadcast domain, regardless of the physical location of the devices. A second VLAN 340 may be established between AN 120-1, the second CN 110, the second CSR 130, and the second EBHR 140. Second VLAN 340 may include a group of devices (e.g., AN 120-1, the second CN 110, the second CSR 130, and the second EBHR 140) with a common set of requirements that communicate as if the devices were attached to the same broadcast domain, regardless of the physical location of the devices. Alternatively, or additionally, one of AN 120-2 and 120-3 may be utilized to establish first VLAN 330 and second VLAN 340.

In one example implementation, first VLAN 330 and second VLAN 340 may contribute to traffic flow redundancy and diversity of traffic transport between first coverage area 310, second coverage area 320, and core network 150 (not shown). In an active-active arrangement, both first VLAN 330 and second VLAN 340 may be configured to be active VLANs. In an active-standby (or failover) arrangement, one of first VLAN 330 and second VLAN 340 may be configured to be an active VLAN and the other one of first VLAN 330 and second VLAN 340 may be configured to be a standby or failover VLAN. For purposes of explanation, it may be assumed that first VLAN 330 is configured to be an active VLAN and that second VLAN 340 is configured to be a standby or failover VLAN.

As shown in FIG. 3B, if the first CN 110 experiences a failure 350, traffic 360 to or from first coverage area 310 may cease completely. However, in the event of failure 350 of the first CN 110, second VLAN 340 may become operational as a VLAN for first coverage area 310. In such an arrangement, traffic transmitted by ANs 120 in first coverage area 310 may be provided to core network 150 via second VLAN 340, and traffic transmitted by core network 150 may be provided to ANs 120 in first coverage area 310 via second VLAN 340, as indicated by reference number 360.

Although FIGS. 3A and 3B show example components of network 300, in other implementations, network 300 may include fewer components, different components, differently arranged components, or additional components than depicted in FIGS. 3A and 3B. Additionally, or alternatively, one or more components of network 300 may perform one or more other tasks described as being performed by one or more other components of network 300.

Figure 4:
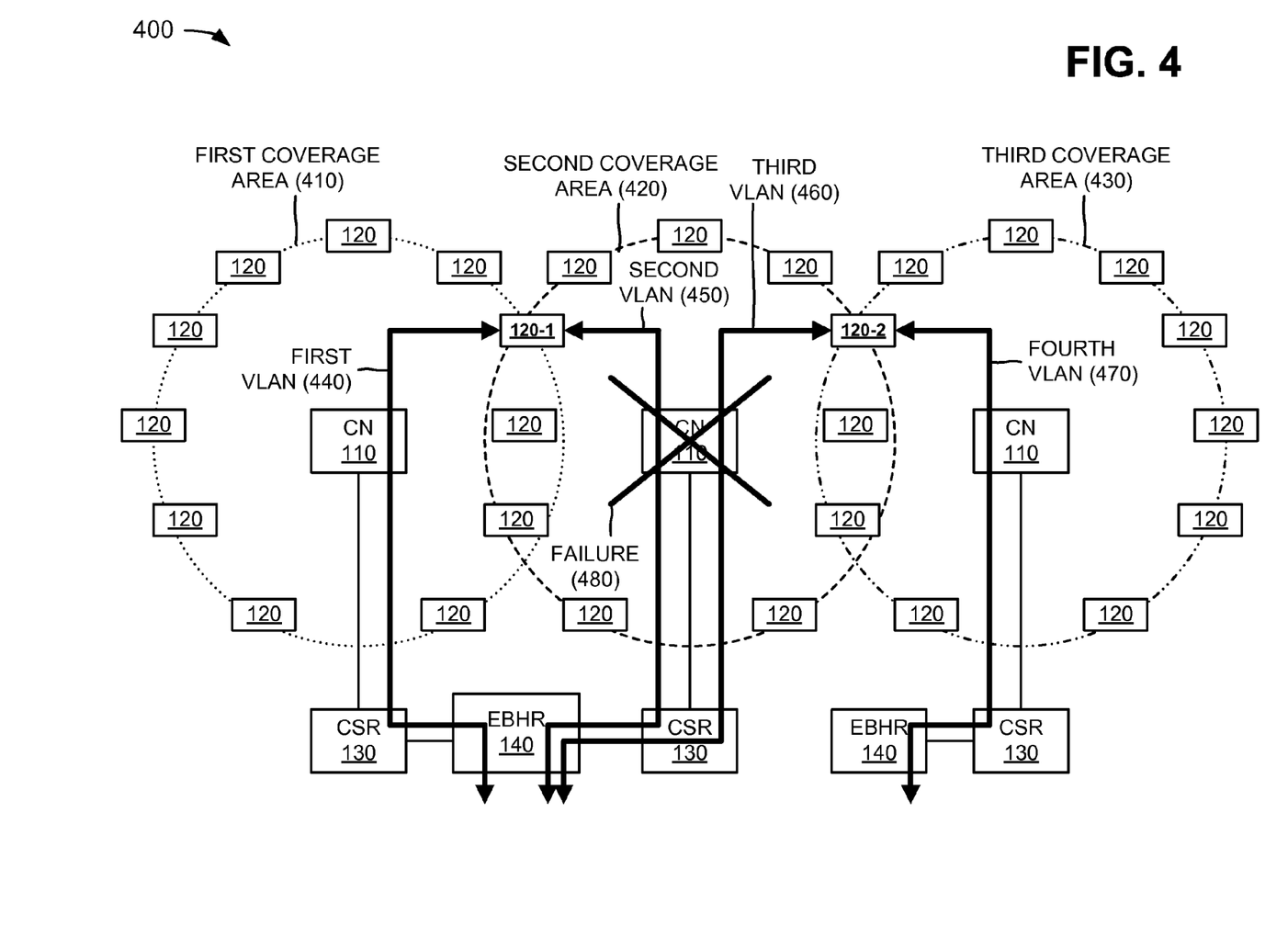
FIG. 4 is a diagram of example operations capable of being performed by still another example network in which systems and/or methods described herein may be implemented.

FIG. 4 is a diagram of example operations capable of being performed by still another example network 400 in which systems and/or methods described herein may be implemented. As shown, network 400 may include a first coverage area 410 that includes a first CN 110, a first group of ANs 120, a first CSR 130, and a first EBHR 140. Network 400 may also include a second coverage area 420 that overlaps with first coverage area 410 and includes a second CN 110, a second group of ANs 120, a second CSR 130, and the first EBHR 140. Network 400 may further include a third coverage area 430 that overlaps with second coverage area 420 and includes a third CN 110, a third group of ANs 120, a third CSR 130, and a third EBHR 140. CNs 110, ANs 120, CSRs 130, and EBHRs 140 may include the features described above in connection with, for example, one or more of FIGS. 1-3B. Devices of network 400 may interconnect via wired and/or wireless connections.

First coverage area 410 may represent an area that is provided wireless coverage via the first CN 110. Second coverage area 420 may represent an area that is provided wireless coverage via the second CN 110. Third coverage area 430 may represent an area that is provided wireless coverage via the third CN 110. As further shown in FIG. 4, one or more ANs 120 may be provided at an intersection of first coverage area 410 and second coverage area 420, and thus may transmit traffic to or receive traffic from either or both of the first and second CNs 110. One or more ANs 120 may be provided at an intersection of second coverage area 420 and third coverage area 430, and thus may transmit traffic to or receive traffic from either or both of the second and third CNs 110.

A first VLAN 440 may be established between one of ANs 120 (e.g., AN 120-1) provided at the intersection of first coverage area 410 and second coverage area 420, the first CN 110, the first CSR 130, and the first EBHR 140. First VLAN 440 may include a group of devices (e.g., AN 120-1, the first CN 110, the first CSR 130, and the first EBHR 140) with a common set of requirements that communicate as if the devices were attached to the same broadcast domain, regardless of the physical location of the devices. A second VLAN 450 may be established between AN 120-1, the second CN 110, the second CSR 130, and the first EBHR 140. Second VLAN 450 may include a group of devices (e.g., AN 120-1, the second CN 110, the second CSR 130, and the first EBHR 140) with a common set of requirements that communicate as if the devices were attached to the same broadcast domain, regardless of the physical location of the devices.

A third VLAN 460 may be established between one of ANs 120 (e.g., AN 120-2) provided at the intersection of second coverage area 420 and third coverage area 430, the second CN 110, the second CSR 130, and the first EBHR 140. Third VLAN 460 may include a group of devices (e.g., AN 120-2, the second CN 110, the second CSR 130, and the first EBHR 140) with a common set of requirements that communicate as if the devices were attached to the same broadcast domain, regardless of the physical location of the devices. A fourth VLAN 470 may be established between AN 120-2, the third CN 110, the third CSR 130, and the third EBHR 140. Fourth VLAN 470 may include a group of devices (e.g., AN 120-2, the third CN 110, the third CSR 130, and the third EBHR 140)

with a common set of requirements that communicate as if the devices were attached to the same broadcast domain, regardless of the physical location of the devices.

In one example implementation, first VLAN 440, second VLAN 450, third VLAN 460, and fourth VLAN 470 may contribute to traffic flow redundancy and diversity of traffic transport between first coverage area 410, second coverage area 420, third coverage area 430, and core network 150 (not shown). In an active-active arrangement, both first VLAN 440 and second VLAN 450 may be configured to be active VLANs. In an active-standby (or failover) arrangement, one of first VLAN 440 and second VLAN 450 may be configured to be an active VLAN and the other one of first VLAN 440 and second VLAN 450 may be configured to be a standby or failover VLAN. In an active-active arrangement, both third VLAN 460 and fourth VLAN 470 may be configured to be active VLANs. In an active-standby (or failover) arrangement, one of third VLAN 460 and fourth VLAN 470 may be configured to be an active VLAN and the other one of third VLAN 460 and fourth VLAN 470 may be configured to be a standby or failover VLAN.

As shown in FIG. 4, if the second CN 110 experiences a failure 480, traffic to or from second coverage area 420 may cease completely. However, in the event of failure 480 of the second CN 110, first VLAN 440 and/or fourth VLAN 470 may become operational as a VLAN for second coverage area 420. In such an arrangement, traffic transmitted by ANs 120 in second coverage area 420 may be provided to core network 150 via first VLAN 440 and/or fourth VLAN 470, and traffic transmitted by core network 150 may be provided to ANs 120 in second coverage area 420 via first VLAN 440 and/or fourth VLAN 470.

If the second CN 110 is operational and the first CN 110 experiences a failure (not shown in FIG. 4), traffic to or from first coverage area 410 may cease completely. However, in the event of a failure of the first CN 110, second VLAN 450 may become operational as a VLAN for first coverage area 410. In such an arrangement, traffic transmitted by ANs 120 in first coverage area 410 may be provided to core network 150 via second VLAN 450, and traffic transmitted by core network 150 may be provided to ANs 120 in first coverage area 410 via second VLAN 450.

If the second CN 110 is operational and the third CN 110 experiences a failure (not shown in FIG. 4), traffic to or from third coverage area 430 may cease completely. However, in the event of a failure of the third CN 110, third VLAN 460 may become operational as a VLAN for third coverage area 430. In such an arrangement, traffic transmitted by ANs 120 in third coverage area 430 may be provided to core network 150 via third VLAN 460, and traffic transmitted by core network 150 may be provided to ANs 120 in third coverage area 430 via third VLAN 460.

Although FIG. 4 show example components of network 400, in other implementations, network 400 may include fewer components, different components, differently arranged components, or additional components than depicted in FIG. 4. Additionally, or alternatively, one or more components of network 400 may perform one or more other tasks described as being performed by one or more other components of network 400.

Figure 5:
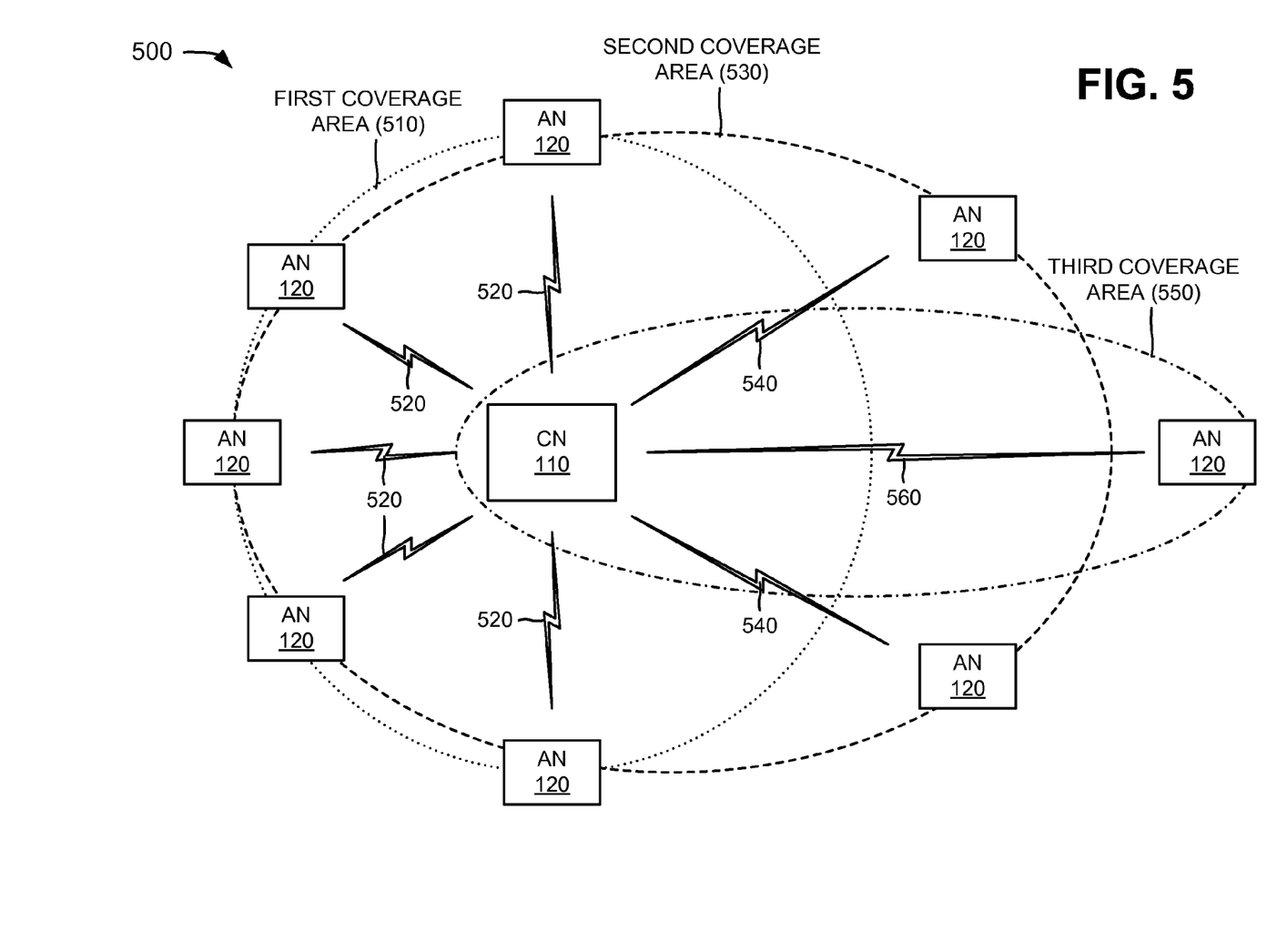
FIG. 5 is a diagram of example operations capable of being performed by an example portion of the network in FIG. 1.

FIG. 5 is a diagram of example operations capable of being performed by an example portion 500 of network 100 (FIG. 1). As shown, network portion 500 may include CN 110 and a group of ANs 120. CN 110 and ANs 120 may include the features described above in connection with, for example, one or more of FIGS. 1-4.

As shown in FIG. 5, network portion 500 may include a first coverage area 510 that represents an area that is provided wireless coverage via CN 110. In one example, first coverage area 510 may provide a particular throughput 520 (e.g., one-hundred (100) Mbps) to some of ANs 120 located within first coverage area 510. Network portion 500 may also include a second coverage area 530 that represents an area that is provided wireless coverage via CN 110. In one example, second coverage area 530 may provide a particular throughput 540 (e.g., one-hundred (100) Mbps) to some of ANs 120 located within second coverage area 530. Network portion 500 may further include a third coverage area 550 that represents an area that is provided wireless coverage via CN 110. In one example, third coverage area 550 may provide a particular throughput 560 (e.g., 100-300 Mbps) to a particular AN 120 located within third coverage area 550.

In one example implementation, first coverage area 510 and second coverage area 530 may represent multiple PMP (e.g., CN 110 to multiple ANs 120) coverage areas of network portion 500. Third coverage area 550 may represent a focused beam PTP (e.g., CN 110 to a single AN 120) coverage area of network portion 500. Such an arrangement may depict how network portion 500 may be configured to provide multiple coverage areas and/or different types of coverage areas for ANs 120.

Although FIG. 5 show example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
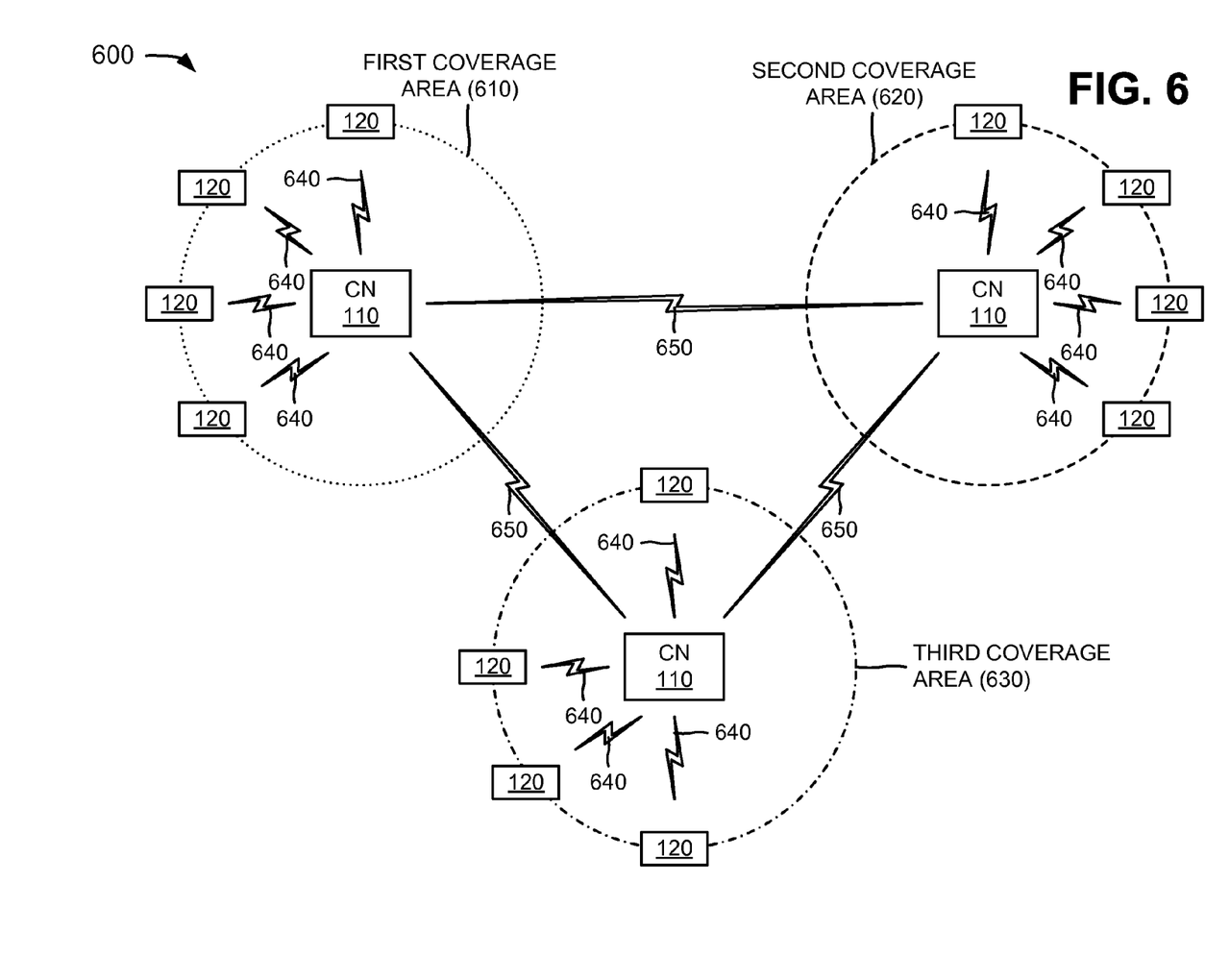
FIG. 6 is a diagram of example operations capable of being performed by a further example network in which systems and/or methods described herein may be implemented.

FIG. 6 is a diagram of example operations capable of being performed by a further example network 600 in which systems and/or methods described herein may be implemented. As shown, network 600 may include a first coverage area 610 that includes a first CN 110 and a first group of ANs 120; a second coverage area 620 that includes a second CN 110 and a second group of ANs 120; and a third coverage area 630 that includes a third CN 110 and a third group of ANs 120. CNs 110 and ANs 120 may include the features described above in connection with, for example, one or more of FIGS. 1-5. Devices of network 600 may interconnect via wired and/or wireless connections.

First coverage area 610 may represent an area that is provided wireless coverage via the first CN 110. Second coverage area 620 may represent an area that is provided wireless coverage via the second CN 110. Third coverage area 630 may represent an area that is provided wireless coverage via the third CN 110. In one example, each of first coverage area 610, second coverage area 620, and third coverage area 630 may provide a particular throughput 640 (e.g., fifty (50) Mbps) to ANs 120 located within each of first coverage area 610, second coverage area 620, and third coverage area 630. As further shown in FIG. 6, the first CN 110, the second CN 110, and the third CN 110 may wirelessly interconnect with a particular throughput 650 (e.g., three hundred (300) Mbps) to each other. In one example implementation, network 600 may represent a concentrator node ring derivative network with multiple CNs 110 (e.g., the first CN 110, the second CN 110, and the third CN 110) interconnected in a ring configuration.

Although FIG. 6 show example components of network 600, in other implementations, network 600 may include fewer components, different components, differently arranged components, or additional components than depicted in FIG. 6. Additionally, or alternatively, one or more components of network 600 may perform one or more other tasks described as being performed by one or more other components of network 600.

Figure 7:
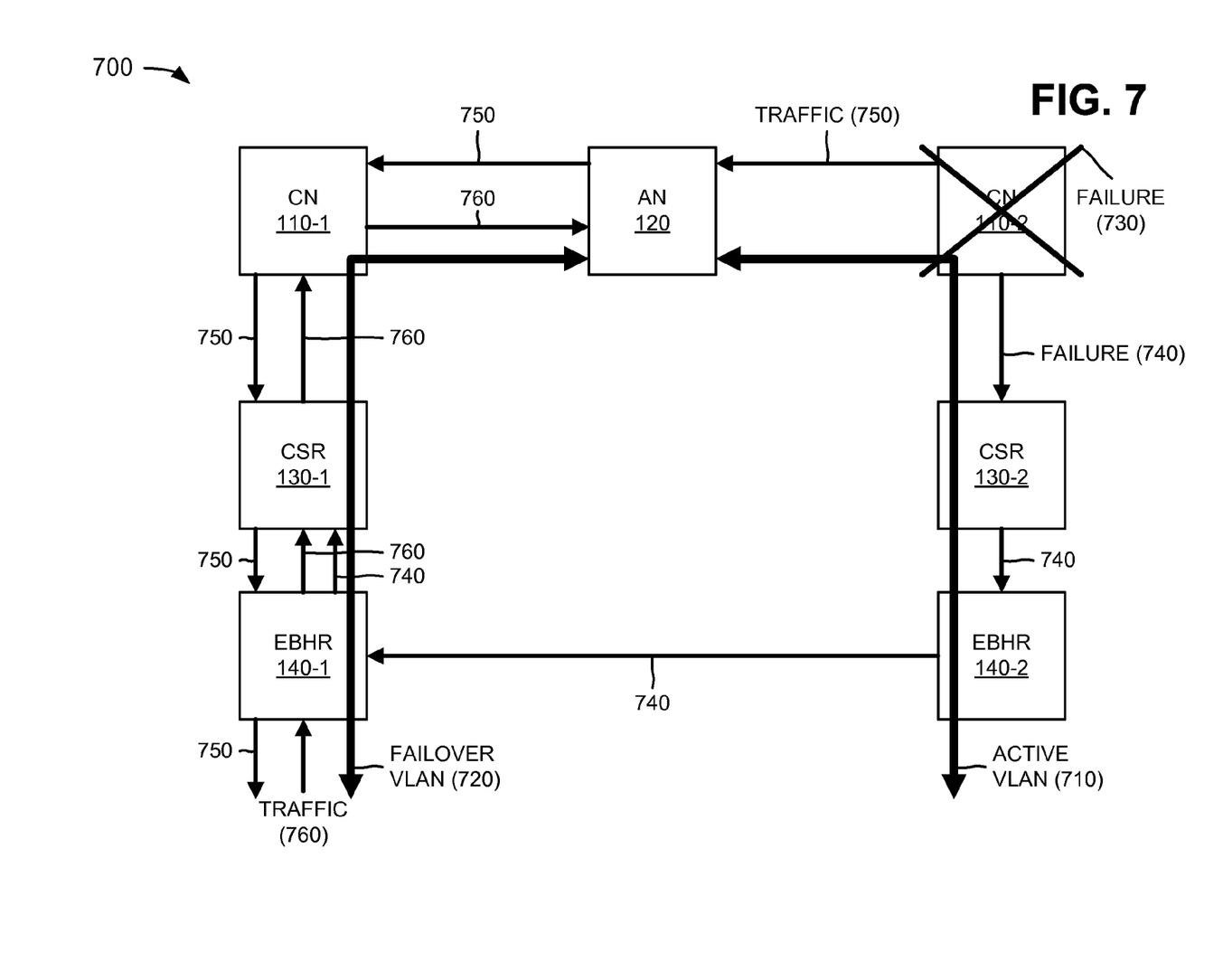
FIG. 7 is a diagram of example operations capable of being performed by another example portion of the network in FIG. 1.

FIG. 7 is a diagram of example operations capable of being performed by another example portion 700 of network 100 (FIG. 1). As shown, network portion 700 may include a first CN 110-1, a first CSR 130-1, a first EBHR 140-1, a second CN 110-2, a second CSR 130-2, a second EBHR 140-2, and AN 120 provided at an intersection of coverage areas provided by first CN 110-1 and second CN 110-2. In one example, first CN 110-1, first CSR 130-1, and first EBHR 140-1 may be interconnected, and second CN 110-2, second CSR 130-2, and second EBHR 140-2 may be interconnected. First CN 110-1, first CSR 130-1, first EBHR 140-1, second CN 110-2, second CSR 130-2, second EBHR 140-2, and AN 120 may include the features described above in connection with, for example, one or more of FIGS. 1-6.

An active VLAN 710 may be established between AN 120, second CN 110-2, second CSR 130-2, and second EBHR 140-2. Active VLAN 710 may include a group of devices (e.g., AN 120, second CN 110-2, second CSR 130-2, and second EBHR 140-2) with a common set of requirements that communicate as if the devices were attached to the same broadcast domain, regardless of the physical location of the devices. A failover VLAN 720 may be established between AN 120, first CN 110-1, first CSR 130-1, and first EBHR 140-1. Failover VLAN 720 may include a group of devices (e.g., AN 120, first CN 110-1, first CSR 130-1, and first EBHR 140-1) with a common set of requirements that communicate as if the devices were attached to the same broadcast domain, regardless of the physical location of the devices. Alternatively, or additionally, failover VLAN 720 may be established as an active VLAN.

In one example implementation, a non-blocking active-active or active-failover VLAN switchover scheme may be established between first CSR 130-1 and second CSR 130-2 using a bidirectional forwarding detection (BFD) protocol for failover detection at first EBHR 140-1 and second EBHR 140-2. In a non-blocking VLAN switchover scheme, traffic to and from a failing CN 110 (e.g., second CN 110-2) may utilize a maximum amount (e.g., one-hundred percent (100%)) of a bandwidth of failover VLAN 720 without oversubscription. In an over-subscription VLAN switchover scheme, traffic to and from a failing CN 110 (e.g., second CN 110-2) may utilize a fraction (e.g., less than 50%) of a bandwidth of failover VLAN 720. Over-subscription may occur when traffic from a failing CN 110, in addition to traffic from an active CN 110 (e.g., first CN 110-1), exceeds an allocated bandwidth (e.g., 1 Gbps) between the active CN 110 and a corresponding CSR 130 (e.g., first CSR 130-1) during normal operation.

As further shown in FIG. 7, if second CN 110-2 experiences a failure 730, traffic to or from second CN 110-2 may cease completely. However, in the event of failure 730 of second CN 110-2, second CN 110-2 may provide a failure indication 740 to second CSR 130-2, and second CSR 130-2 may forward failure indication 740 (e.g., via the BFD protocol) to second EBHR 140-2. Second EBHR 140-2 may forward failure indication 740 to first EBHR 140-1, and first EBHR 140-1 may forward failure indication 740 to first CSR 130-1. Based on failure indication 740, first CSR 130-1 may enable failover VLAN 720 to become operational as a VLAN for traffic associated with second CN 110-2.

In such an arrangement, traffic 750 associated with second CN 110-2 may be forwarded by AN 120, via failover VLAN 720, to core network 150 (not shown). For example, AN 120 may forward traffic 750 to first CN 110-1, and first CN 110-1 may forward traffic 750 to first CSR 130-1. First CSR 130-1 may forward traffic 750 to first EBHR 140-1, and first EBHR 140-1 may forward traffic 750 to core network 150. Traffic 760 generated by core network 150, and destined for second CN 110-2, may be forwarded by first EBHR 140-1, via failover VLAN 720, to AN 120. For example, first EBHR 140-1 may forward traffic 760 to first CSR 130-1, and first CSR 130-1 may forward traffic 760 to first CN 110-1. First CN 110-1 may forward traffic 760 to AN 120.

Although FIG. 7 show example components of network portion 700, in other implementations, network portion 700 may include fewer components, different components, differently arranged components, or additional components than depicted in FIG. 7. Additionally, or alternatively, one or more components of network portion 700 may perform one or more other tasks described as being performed by one or more other components of network portion 700.

Figure 8:
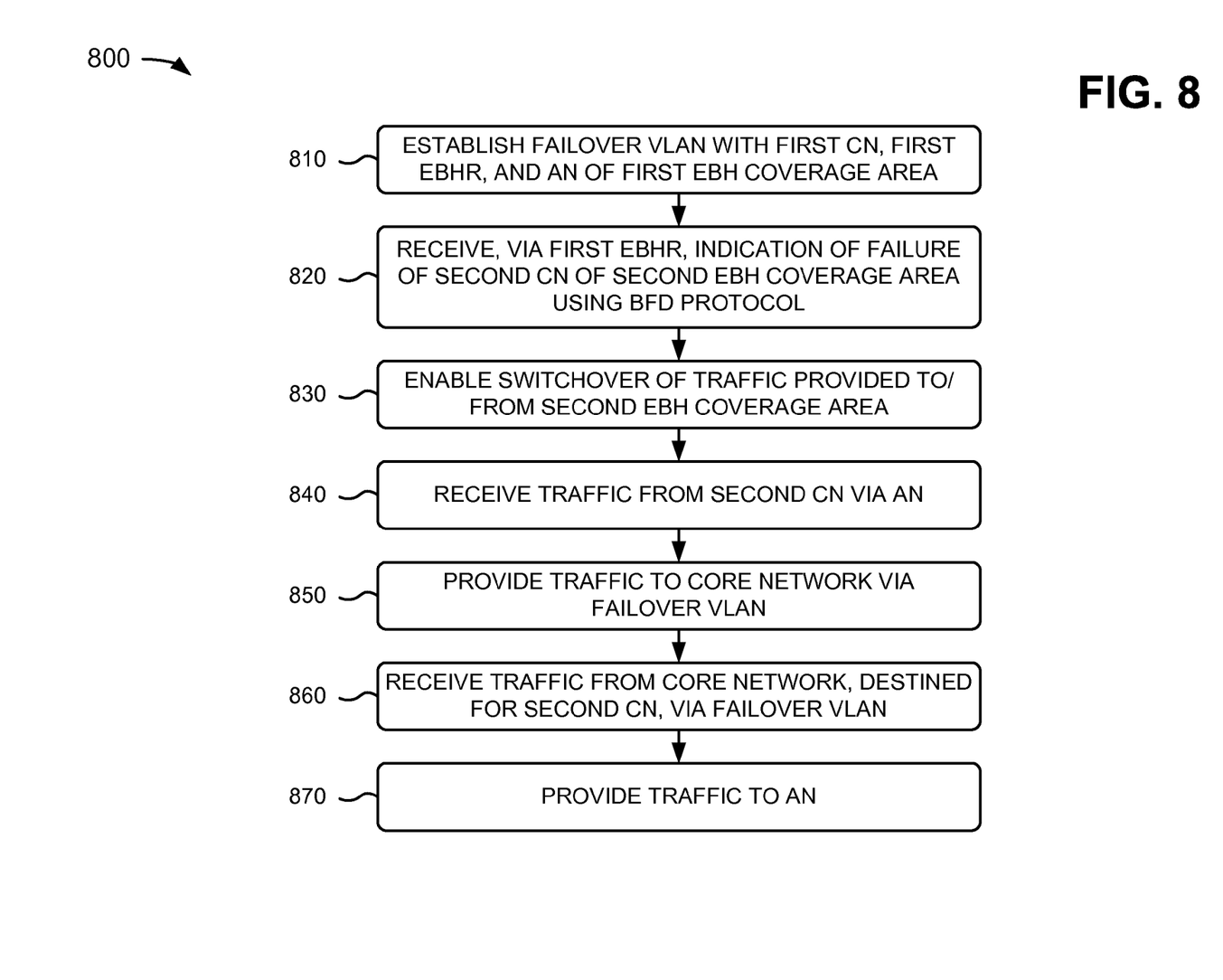
FIGS. 8-10 are flow charts of an example process for providing redundancy in PMP backhaul networks according to an implementation described herein.
Figure 9:
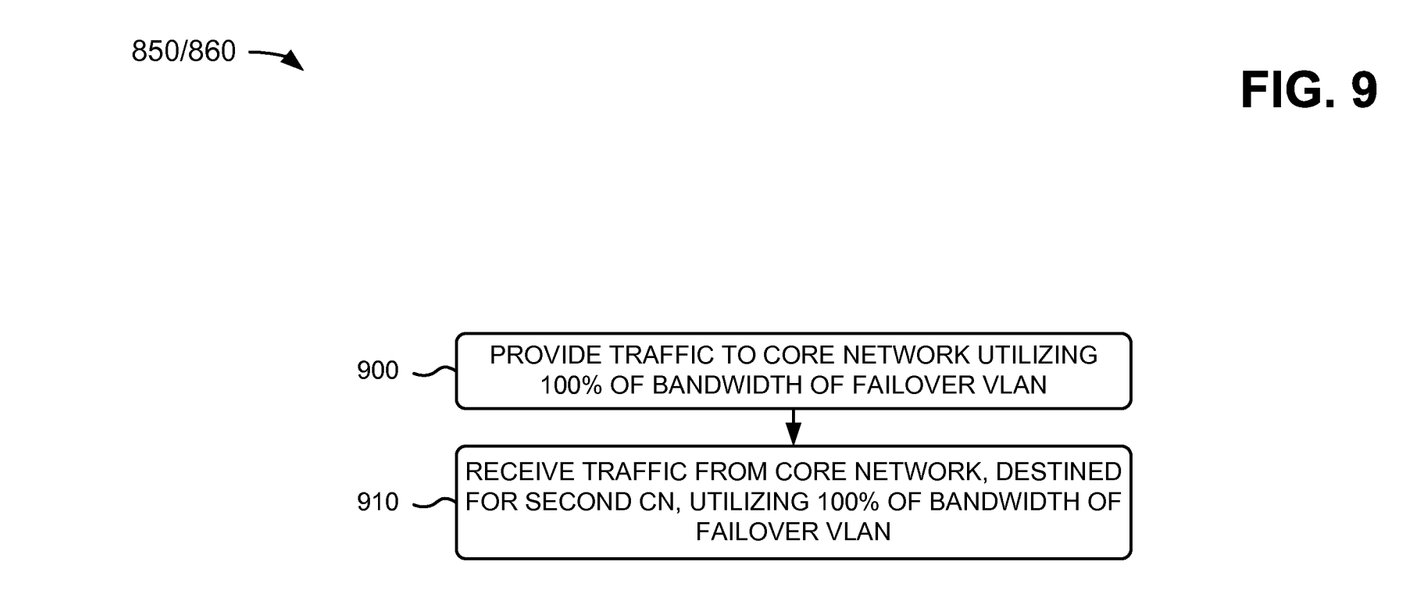
Figure 10:
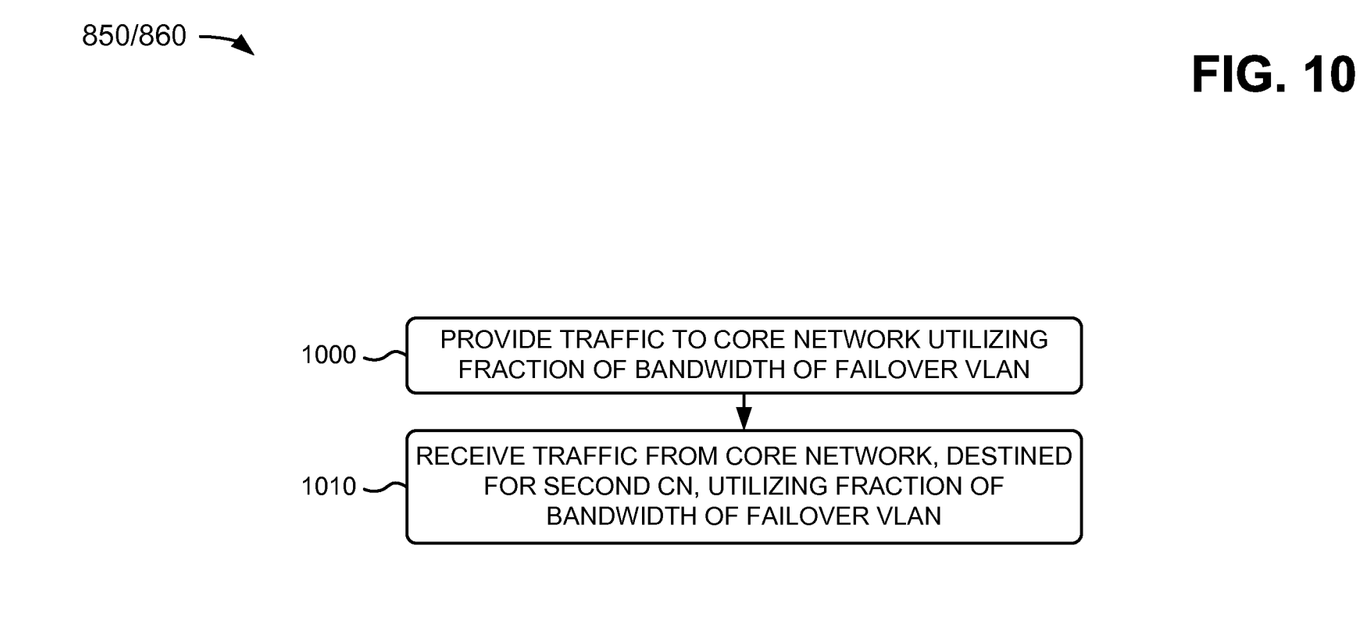

FIGS. 8-10 are flow charts of an example process 800 for providing redundancy in PMP backhaul networks according to an implementation described herein. In one implementation, process 800 may be performed by CSR 130. Alternatively, or additionally, some or all of process 800 may be performed by another device or group of devices, including or excluding CSR 130.

As shown in FIG. 8, process 800 may include establishing a failover VLAN with a first CN, a first EBHR, and an AN of a first EBH coverage area (block 810), and receiving, via the first EBHR, an indication of failure of a second CN of a second EBH coverage area using a BFD protocol (block 820). For example, in an implementation described above in connection with FIG. 7, failover VLAN 720 may be established between AN 120, first CN 110-1, first CSR 130-1, and first EBHR 140-1. Failover VLAN 720 may include a group of devices (e.g., AN 120, first CN 110-1, first CSR 130-1, and first EBHR 140-1) with a common set of requirements that communicate as if the devices were attached to the same broadcast domain, regardless of the physical location of the devices. In the event of failure 730 of second CN 110-2, second CN 110-2 may provide failure indication 740 to second CSR 130-2, and second CSR 130-2 may forward failure indication 740 (e.g., via the BFD protocol) to second EBHR 140-2. Second EBHR 140-2 may forward failure indication 740 to first EBHR 140-1, and first EBHR 140-1 may forward failure indication 740 to first CSR 130-1.

As further shown in FIG. 8, process 800 may include enabling a switchover of traffic provided to/from the second EBH coverage area (block 830), receiving traffic from the second CN via the AN (block 840), and forwarding the traffic to a core network via the failover VLAN (block 850). For example, in an implementation described above in connection with FIG. 7, based on failure indication 740, first CSR 130-1 may enable failover VLAN 720 to become operational as a VLAN for traffic associated with second CN 110-2. In such an arrangement, traffic 750 associated with second CN 110-2 may be forwarded by AN 120, via failover VLAN 720, to core network 150. In one example, AN 120 may forward traffic 750 to first CN 110-1, and first CN 110-1 may forward traffic 750 to first CSR 130-1. First CSR 130-1 may forward traffic 750 to first EBHR 140-1, and first EBHR 140-1 may forward traffic 750 to core network 150.

Returning to FIG. 8, process 800 may include receiving traffic from the core network, destined for the second CN, via the failover VLAN (block 860), and providing the traffic to the AN (block 870). For example, in an implementation described above in connection with FIG. 7, traffic 760 generated by core network 150, and destined for second CN 110-2, may be forwarded by first EBHR 140-1, via failover VLAN 720, to AN 120. In one example, first EBHR 140-1 may forward traffic 760 to first CSR 130-1, and first CSR 130-1 may forward traffic 760 to first CN 110-1. First CN 110-1 may forward traffic 760 to AN 120.

Process blocks 850/860 may include the process blocks depicted in FIG. 9. As shown in FIG. 9, process blocks 850/860 may include providing traffic to the core network utilizing 100% of a bandwidth of the failover VLAN (block 900), and receiving traffic from the core network, destined for the second CN, utilizing 100% of the bandwidth of the failover VLAN (block 910). For example, in an implementation described above in connection with FIG. 7, in one example, a non-blocking active-active or active-failover VLAN switchover scheme may be established between first CSR 130-1 and second CSR 130-2 using a BFD protocol for failover detection at first EBHR 140-1 and second EBHR 140-2. In a non-blocking VLAN switchover scheme, traffic to and from a failing CN 110 (e.g., second CN 110-2) may utilize a maximum amount (e.g., 100%) of a bandwidth of failover VLAN 720 without over-subscription.

Alternatively, or additionally, process blocks 850/860 may include the process blocks depicted in FIG. 10. As shown in FIG. 10, process blocks 850/860 may include providing traffic to the core network utilizing a fraction of a bandwidth of the failover VLAN (block 1000), and receiving traffic from the core network, destined for the second CN, utilizing a fraction of the bandwidth of the failover VLAN (block 1010). For example, in an implementation described above in connection with FIG. 7, in an over-subscription VLAN switchover scheme, traffic to and from a failing CN 110 (e.g., second CN 110-2) may utilize a fraction (e.g., less than 50%) of a bandwidth of failover VLAN 720. Over-subscription may occur when traffic from a failing CN 110, in addition to traffic from an active CN 110 (e.g., first CN 110-1), exceeds an allocated bandwidth (e.g., 1 Gbps) between the active CN 110 and a corresponding CSR 130 (e.g., first CSR 130-1) during normal operation.

Systems and/or methods described herein may provide backhaul redundancy and diversity between and among two or more concentration nodes of a PMP wireless backhaul network. In a mutually covered intersection between areas covered by two concentration nodes, traffic from an access node may be actively provided to and from both concentration nodes. If one concentration node fails, traffic may still flow actively to the other concentration node which may minimize the impact of a total failure among access nodes served by the failed concentration node. The use of active-active or active-standby virtual local area networks (VLANs) may contribute to traffic flow redundancy and diversity of transport to and from a core network.

Furthermore, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   establishing, by a device, a failover virtual local area network (VLAN) associated with:
   a first concentration node that receives and transmits traffic to and from a plurality of access nodes, wherein the plurality of access nodes are configured to transmit and receive traffic from other devices, and wherein the plurality of access nodes are associated with a first Ethernet backhaul coverage area, and
   at least one cell site router to receive and transmit traffic to and from the first concentration node and a first Ethernet backhaul router, wherein the first Ethernet backhaul router provides aggregation services for the at least one cell site router, and transmits and receives traffic, via the at least one cell site router, between the first concentration node and a core network;
   receiving, by the device and via the first Ethernet backhaul router, an indication of a failure of a second concentration node associated with a second Ethernet backhaul coverage area, wherein the second Ethernet backhaul coverage area intersects with the first Ethernet backhaul coverage area at one or more of the plurality of access nodes; and
   enabling, by the device and based on the failure indication, a switchover of traffic, associated with the second concentration node, to the device via the failover VLAN.

2. The method of claim 1, wherein enabling the switchover of traffic to the device via the failover VLAN comprises:
   routing traffic to the first Ethernet backhaul router, the at least one cell site router, the first concentration node, and the one or more plurality of access nodes.

3. The method of claim 1, where the failure indication is received using a bidirectional forwarding detection (BFD) protocol.

4. The method of claim 1, further comprising:
   receiving the traffic that is destined for the second concentration node via the one or more of the plurality of access nodes; and
   providing the traffic to the core network via the failover VLAN.

5. The method of claim 4, where the traffic is provided to the core network by utilizing all of a bandwidth of the failover VLAN.

6. The method of claim 4, where the traffic is provided to the core network by utilizing a fraction of a bandwidth of the failover VLAN.

7. The method of claim 1, further comprising:
   receiving the traffic from the core network, destined for the second concentration node, via the failover VLAN; and
   providing the traffic to the one or more of the plurality access nodes.

8. The method of claim 7, where the traffic is received from the core network by utilizing all of a bandwidth of the failover VLAN.

9. The method of claim 7, where the traffic is received from the core network by utilizing a fraction of a bandwidth of the failover VLAN.

10. A device, comprising:
a processor to:
establish a failover virtual local area network (VLAN) with:
a first concentration node that is configured to receive and transmit traffic to and from a plurality of access nodes, wherein the plurality of access nodes are configured to transmit and receive traffic from other devices and wherein the plurality of access nodes are associated with a first Ethernet backhaul coverage area, and
a cell site router that is configured to receive and transmit traffic to and from the first concentration node and a first Ethernet backhaul router, wherein the first Ethernet backhaul router is configured to provide aggregation services for the cell site router and to transmit and receive traffic, via the cell site router, between the first concentration node and a core network,
receive, via the first Ethernet backhaul router, an indication of a failure of a second concentration node associated with a second Ethernet backhaul coverage area, wherein the second Ethernet backhaul coverage area intersects with the first Ethernet backhaul coverage area at one of the plurality of access nodes, and
enable, based on the failure indication, a switchover of traffic, associated with the second concentration node, to the device and via the failover VLAN using the one of the plurality of access nodes.

11. The device of claim 10, where the failure indication is received using a bidirectional forwarding detection (BFD) protocol.

12. The device of claim 10, where the processor is further to:
receive the traffic destined for the second concentration node via the one of the plurality of access nodes, and
provide the traffic to the core network via the failover VLAN.

13. The device of claim 12, where the traffic is provided to the core network by utilizing all or a fraction of a bandwidth of the failover VLAN.

14. The device of claim 10, where the processor is further to:
receive the traffic from the core network, destined for the second concentration node, via the failover VLAN, and
provide the traffic to the access node.

15. The device of claim 14, where the traffic is received from the core network by utilizing all or a fraction of a bandwidth of the failover VLAN.

16. A computer-readable medium, comprising:
one or more instructions that, when executed by a processor, cause the processor to:
establish a standby virtual local area network (VLAN) with a first concentration node, a first Ethernet backhaul router, and an access node of a first Ethernet backhaul coverage area,
receive, via the first Ethernet backhaul router, an indication of a failure of a second concentration node of a second Ethernet backhaul coverage area, wherein the second Ethernet backhaul coverage area intersects with the first Ethernet backhaul coverage area at the access node, and
enable, based on the failure indication, a switchover of traffic, associated with the second concentration node, to the device and via the standby VLAN using the access node.

17. The computer-readable medium of claim 16, where the failure indication is received using a bidirectional forwarding detection (BFD) protocol.

18. The computer-readable medium of claim 16, further comprising:
one or more instructions that, when executed by the processor, cause the processor to:
receive the traffic destined for the second concentration node via the access node, and
provide the traffic to a core network via the standby VLAN.

19. The computer-readable medium of claim 18, where the traffic is provided to the core network by utilizing all or a fraction of a bandwidth of the standby VLAN.

20. The computer-readable medium of claim 16, further comprising:
one or more instructions that, when executed by the processor, cause the processor to:
receive the traffic from a core network, destined for the second concentration node, via the standby VLAN, and
provide the traffic to the access node.

21. The computer-readable medium of claim 20, where the traffic is received from the core network by utilizing all or a fraction of a bandwidth of the standby VLAN.

22. The computer-readable medium of claim 16, where each of the first Ethernet backhaul coverage area and the second Ethernet backhaul coverage area comprises a point-to-multipoint (PMP) wireless Ethernet backhaul network.

23. The computer-readable medium of claim 16, where the computer-readable medium is provided in a cell site router connected to the first concentration node.

\* \* \* \* \*